Nov. 15, 1938.   P. P. MARSHALL   2,137,115
APPARATUS FOR BENDING GLASS SHEETS
Filed May 29, 1937   9 Sheets-Sheet 1

INVENTOR
PHILIP P. MARSHALL
BY Bradley & Bee
ATTORNEYS.

Nov. 15, 1938.    P. P. MARSHALL    2,137,115
APPARATUS FOR BENDING GLASS SHEETS
Filed May 29, 1937    9 Sheets-Sheet 9

Fig. 12.

INVENTOR
PHILIP P. MARSHALL
BY
Bradley & Bee
ATTORNEYS.

Patented Nov. 15, 1938

2,137,115

UNITED STATES PATENT OFFICE 2,137,115

APPARATUS FOR BENDING GLASS SHEETS

Philip P. Marshall, Ford City, Pa., assignor to Pittsburgh Plate Glass Company, Allegheny County, Pa., a corporation of Pennsylvania Application May 29, 1937, Serial No. 145,412

5 Claims. (Cl. 49—58)

The invention relates to an apparatus for bending glass sheets in the so-called sand molds. Heretofore, the practice has been to place the glass sheet to be bent on a concave sand mold, heat the sheet in an oven until it softens and settles into the mold, and then cool to handling temperature in the oven from which the heat is cut off as soon as the glass is bent. The cycle requires about 24 hours, due to the mass of the sand mold which takes a long period to bring up to the desired temperature and a correspondingly long time to cool down to a point at which the glass can be removed and handled. The heat losses were also unduly large, due to the fact that the relatively large mass comprising the sand and its metal container must be heated up and cooled off for each operation. The objects of the present invention are to reduce the time cycle to a small fraction of the 24 hour period and to reduce the heat losses incident to the practice as above described. In practicing the invention, sand molds are employed, similar to those heretofore used, but such molds are mounted on cars and carried through a tunnel kiln of progressively increasing temperature to bring the sheets to a temperature at which they are bent by gravity and settle into the molds. In a further travel through the kiln, the temperature is reduced to a point somewhat below the critical annealing range, at which temperature the glass has set, permitting the removal of the sheets from the molds. By lifting members embedded in the sand of the molds, the sheets are now removed from the molds and transferred to a cooling tunnel through which they are carried and reduced in temperature to a point at which they may be handled. The cars with the molds thereon are returned, after the removal of the glass sheets to their starting position to repeat the bending cycle with new sheets. Before reuse, the molds must be supplied with new lifting means embedded in the sand and the surface sand smoothed over to cover the lifting means and restore the contour. The whole cycle can be carried out in three hours or less, due in part to the use of the tunnel kiln, in part to the fact that the glass is cooled independently of the molds, such cooling being at a much higher rate than is possible when the sheets are cooled in the molds in accordance with previous practice, since the relatively large mass of a mold and its container prevent rapid cooling, and in part to the fact that the molds can be reused while they retain a large amount of the heat incident to the previous cycle. Certain embodiments of the apparatus preferably employed are shown in the accompanying drawings, wherein:

Figure 1:
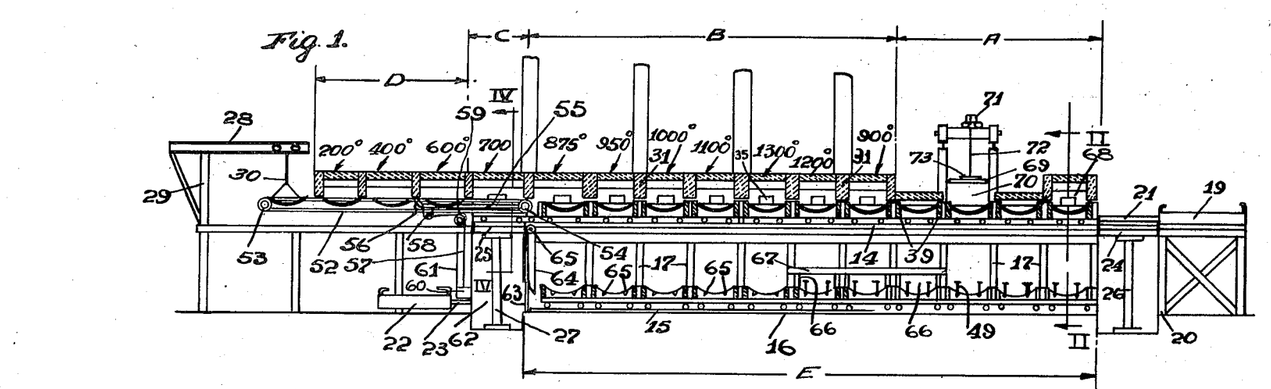
Figure 1 is a vertical section through the apparatus on the line I—I of Fig. 2.
Figure 2:
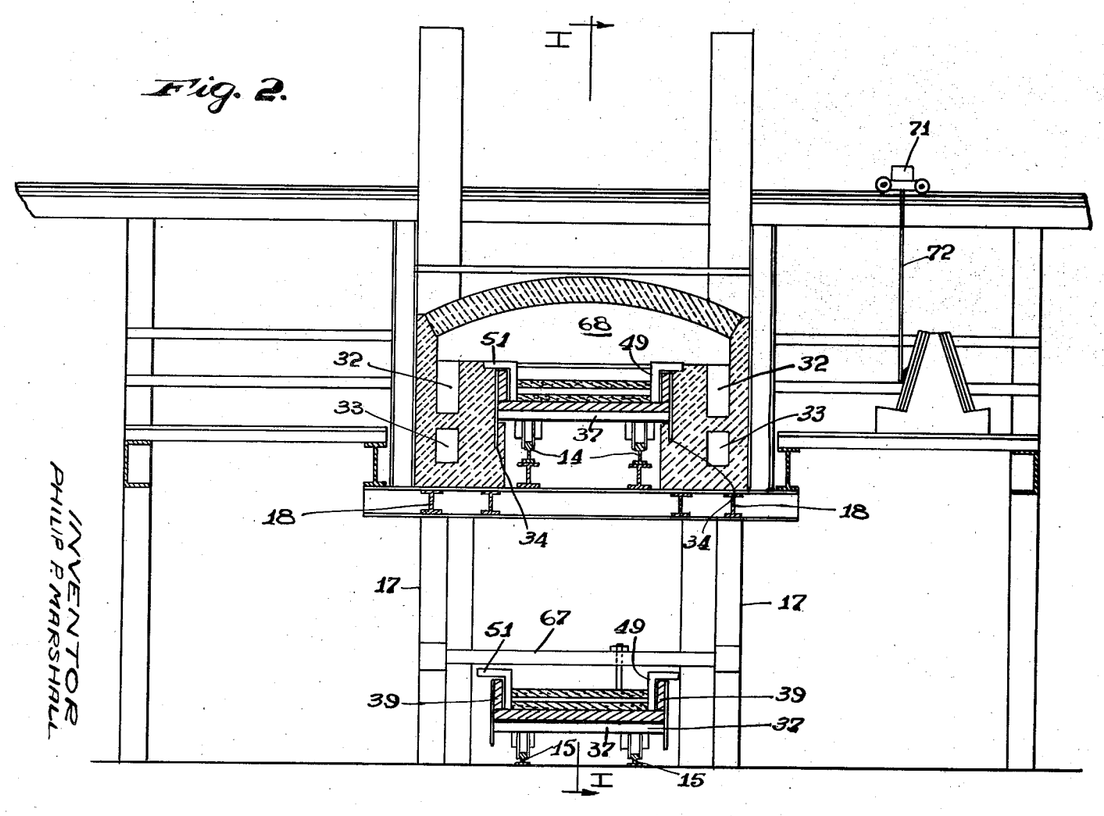
Fig. 2 is a vertical section on the line II—II of Fig. 1.

Referring first to the construction shown in Figs. 1 to 7, the process here involved is carried out upon a pair of tracks 14 and 15 arranged one above the other, as indicated in Figs. 1 and 2. The processing steps, including the bending and annealing of the glass sheets and the cooling thereof are carried out on the track 14, while the track 15 is employed merely for returning the cars carrying the molds to starting position at the end of the track 14. In each case, the cars are moved as a train step by step along each track with a suitable pause between each movement. The lower track 15 is mounted upon the floor 16 of the building in which the apparatus is housed, while the track 14 is supported upon a suitable framework of commercial sections comprising the series of posts 17 and the longitudinal channels 18. The cars on the upper track 14 are moved step by step by means of a hydraulic pusher, including the cylinder 19 mounted upon a framework 20 and the plunger 21 which is positioned so as to engage the last car of the train. The reciprocation of the plunger at suitable intervals gives the train of cars on the upper track its necessary movement to the left. The train of cars on the lower tracks 15 is moved step by step to the right to return them to starting position by means of a hydraulic cylinder 22 mounted on the floor of the building and provided with a plunger 23 adapted to engage the last car of the train on the lower track. Transfer means are provided for the cars between the upper and lower tracks in the form of the lifts 24 and 25 mounted upon the hydraulic plungers 26 and 27. These lifts are provided with tracks which register with the tracks 14 and 15. When the operation of the hydraulic pusher 22, 23 has moved a car onto the lift 24, such lift is operated to move the car upward and bring it in line with the train of cars on the track 14. At the same time, the lift 25 is lowered, bringing a car from the track 14 to the level of the track 15. In this manner, the cars are shifted from one track to the other to meet the requirements of the step by step operation.

The process steps on the upper track 14 include the preliminary handling operations in the section A, the bending and annealing operations in section B, the removal of the bent sheets from the molds in the section C, and the cooling of the glass sheets to handling temperature in the section D. The track 14 ends with the section C and from this point on, the sheets are carried through the section D on an endless chain carrier, later described, the movement of this chain carrier being accomplished by the movement of the train of cars on the track 14, so that the movements in this section of the apparatus are in step with the movements of the cars. As the bent sheets emerge from the left hand end of the section D, they are removed and transferred to a position at one side of the carrier, this being accomplished by means of a suitable crane 28 pivoted on the column 29 and provided at its end with a swing 30 adapted to engage the edges of the glass sheets.

The kilns are divided into sections by the partition walls 31 and are heated by gas burners, suitable flues 32 and 33 (Fig. 2) being provided in the side walls for the circulation of the heated gases. The bottom side of the kiln is closed by means of the car bodies themselves which are provided with depending flanges working in slots 34 (Fig. 2) carrying sand seals. The various sections of the kiln are heated to give a progressive change of temperature, as indicated by the notations on Fig. 1, the definite temperatures being set forth for clearness in illustration, as it will be understood that these temperatures are not exact and may vary considerably and that the number of sections into which the kiln is divided may vary depending upon conditions and upon the capacity for which the apparatus is designed. The first section has a temperature in the neighborhood of 900 deg. F., the second one a temperature of 1200 deg. F., and the third one a temperature of about 1300 deg. F., the latter section being the one in which the bending of the glass sheet to the mold occurs. This section, as well as other sections of the leer, are provided with openings 35 in the sides having suitable closures, and in the bending section, the settling of the glass into the mold may be helped by means of a tool inserted through the door so that pressure can be applied to the glass, this helping procedure being one which is well known in the bending of glass, so that the fit of the glass to the mold may be accomplished at a somewhat lower temperature than would otherwise be the case. The sections of the kiln following the bending section decrease in temperature until section C is reached. At this point, the glass has passed through the critical annealing range (ordinarily about 1050 to 950 deg. F.) and may be removed from the mold with safety. At this point, the glass is removed from the mold as the car is lowered for return to the starting end of the kiln through the section E. It is transferred by means later described to the section D through which it is carried at gradually decreasing temperature so that at its outlet end the glass may be conveniently handled and removed by the swing 30.

Figure 3:
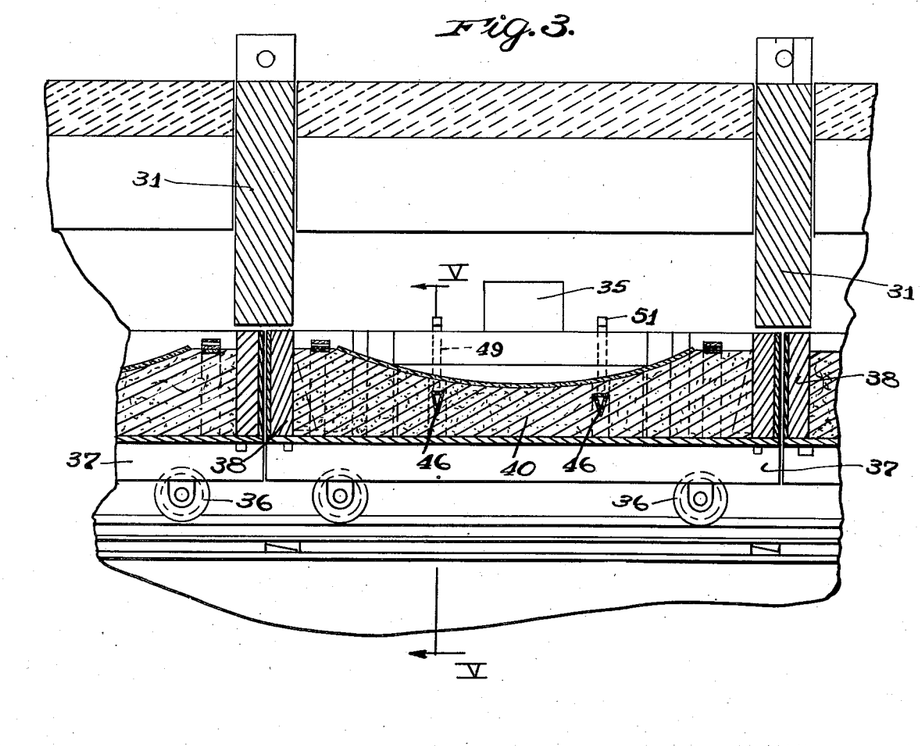
Fig. 3 is a partial section on an enlarged scale on the line I—I of Fig. 2.
Figure 4:
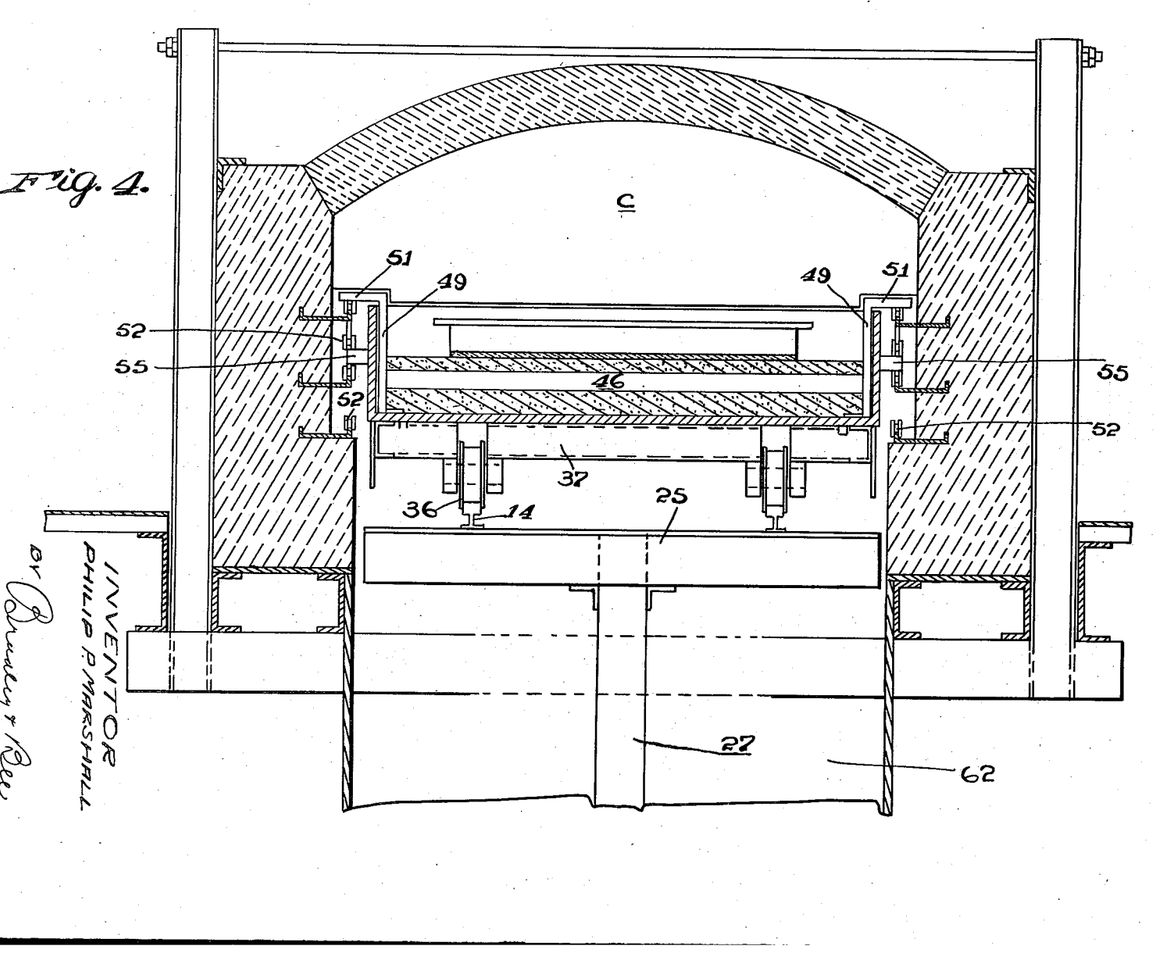
Fig. 4 is an enlarged section on the line IV—IV of Fig. 1.
Figure 5:
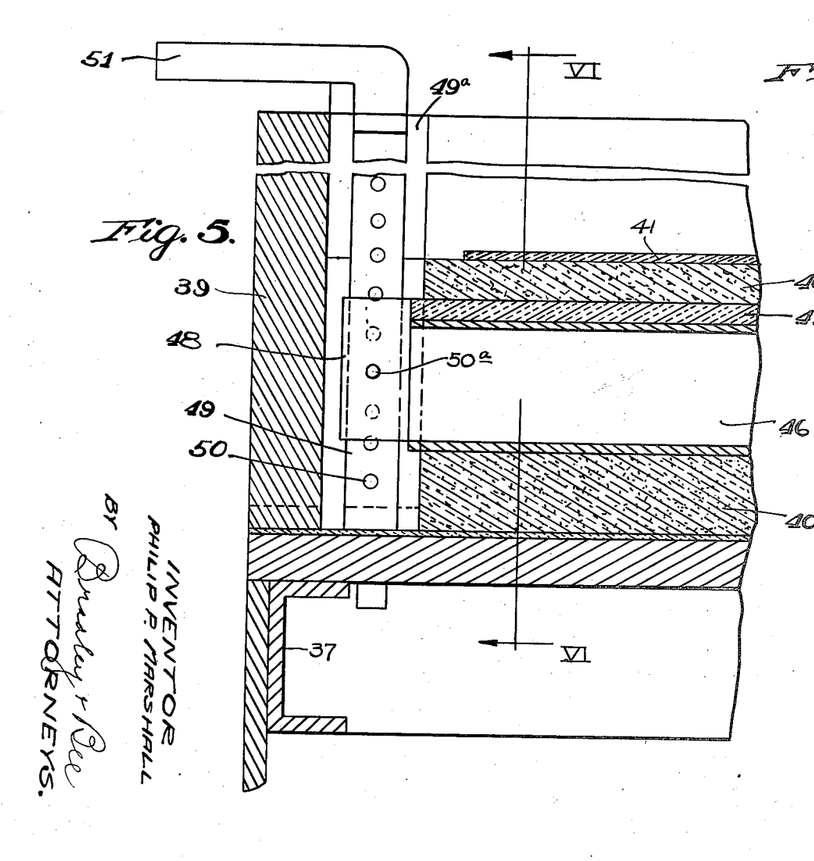
Figs. 5 and 6 are partial sections on an enlarged scale, Fig. 5 being taken on the line V—V of Fig. 3, and Fig. 6 on the line VI—VI of Fig. 5.
Figure 6:
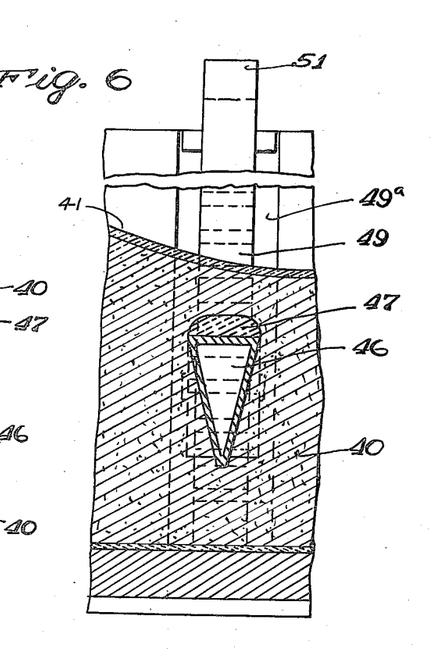
Figure 7:
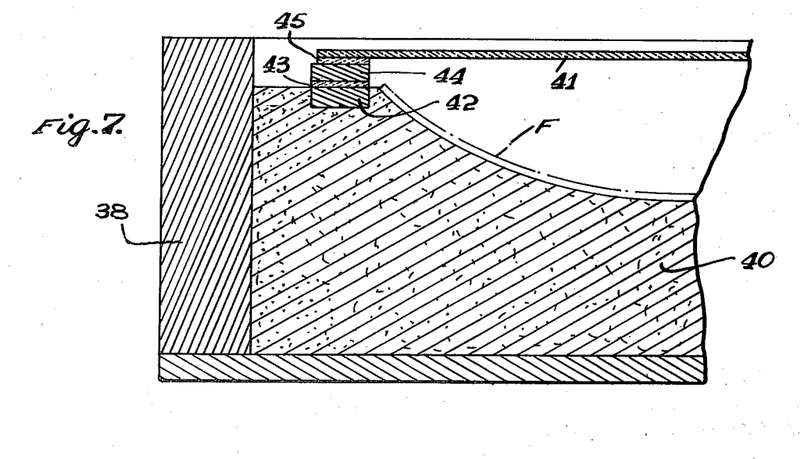
Fig. 7 is a detail section in the same plane as Fig. 3, but on a larger scale and showing the parts in the position occupied before bending the glass.

The car and mold structure will be clear by reference to Figs. 3, 5 and 6 in connection with Fig. 1. The four wheels 36 of the car are carried by suitable underframing 37, and upon this underframing is a container made up of the side walls 38, 38 and the end walls 39, 39. The container carries the mold material 40 which is ordinarily a body of sand mixed with finely divided fire clay of such consistency that the mold will maintain its contour after being shaped so that its surface has the desired curvature. This curvature may be of various shapes depending upon requirements, and several different plates may be bent in the same mold, if the size is small. The means employed to secure the desired contour in the sand mold are the same as those heretofore employed in the art, templates being used to smooth off the sand to the desired shape. The edges of the glass sheet 41 to be bent are preferably supported, as indicated in Fig. 7. A metal strip 42 is embedded in the sand along each side of the mold and carries a strip of asbestos 43 on which is a second metal strip 44 which carries a strip of asbestos 45. In the bending operation the edges of the glass sheet move inward and the parts 44 and 45 slide with them on the surface of the strips 43 until the sheet is well settled into the mold, at which time the strips 44 and 45 are removed from the car by the operators working through the openings 35 in the side walls of the kiln. The glass finally reaches the dotted line position F indicated in Fig. 7. At a later stage in the operation, when the surface of the mold is being smoothed over for another operation, the metal strips 42 act as guides, upon which the bars carrying the templates may rest in the movement of the template longitudinally of the mold.

Provision is made for lifting the bent sheet from the car when it reaches the section C of the kiln in the form of a pair of metal bars 46, 46 embedded in the sand and having a length slightly greater than that of the sheet. These bars are preferably hollow, as indicated in Fig. 6, and of wedge form to facilitate forcing them down through the sand to the desired position. The upper faces of the bars are preferably provided with layers of asbestos 47, which act as insulation and tend to prevent any marring of the glass when the sheet is lifted from the mold. Each bar is provided at its end with a rectangular guide socket 48 (Fig. 5) and through this extends a supporting bar 49 provided with a series of perforations 50. The sides of the socket 48 are provided with perforations through which a pin 50a extends for locking the member 49 to the socket 48. This permits the bars to be used with molds having different degrees of curvature, since the bars must be set at different distances from the bottom of the container, depending upon the curvature of the face of the mold. The end walls 39 of the mold are slotted to receive the members 48 and bars 49, as indicated at 49a in Figs. 5 and 6, such slots serving as guides to maintain the members 49 in vertical position and in the same relative position at the two sides of the container. The ends of the bars 49 are bent laterally, as indicated at 51, Fig. 5, and serve as the means for lifting the bars 46 and the glass carried thereby from the mold in the section C of the kiln when the car is moved downward to bring it into alinement with the track 15.

The means for supporting the bars 46 and the glass sheet carried thereby when the lift 25 moves downward comprises a pair of endless chains 52 mounted in the side walls of the kiln (Fig. 4) and passing around the pulleys 53 and 54. This location brings the chains beneath the laterally extending ends 51 of the bars 49 as will be seen by reference to Fig. 4, so that when the car on the elevator 25 moves down, the carrier for the sheet comprising the bars 46 and the members 49 is left suspended on the chains in the section C of the kiln. The chains also act as the means for carrying the glass sheets through the cooling tunnel D in which their temperature is progressively reduced to the handling point. The chains are given a step by step movement by the train of cars itself. This is accomplished by means of a pair of pusher bars 55 (Fig. 4) mounted in the side walls of the kiln for sliding movement endwise thereof. These bars have their rear ends positioned so that they are engaged by the car coming into the section C of the leer. It follows that, as the car enters the section C, the chain carriers are moved ahead one step. The forward end of each bar is provided with a pivoted dog 56, whose upper end is adapted to hook into the chain and move it forward as the bar is moved forward. When the car in the section C moves downward and out of such section, the rear ends of the pusher bars 55 are released, so that such bars may be moved to the rear. This movement to the rear is accomplished by means of cables 57 (Fig. 1) attached to the bar at 58 and passing over pulleys 59, the end of the cable being attached to a weight 60 working in a suitable casing 61. It will be seen, therefore, that after each forward movement of the conveyor chains, the pusher bars are returned to starting position and that the movement of the train of cars, plus the action of the return weight 60, gives the bars the necessary reciprocating movement to carry the glass sheets in the kiln section D forward step by step.

The well 62, in which the lift 25 moves is preferably closed on all sides to prevent any undue cooling of section C of the kiln during the downward movement of the lift. The closure on the forward side of this well includes a door 63 mounted for vertical sliding movement, such door being closed, as indicated in Fig. 1, when the lift is in upper position. This door is connected with the lift, so that when the lift approaches bottom position, the door 63 is lifted to provide a passageway for the car onto the track 15. The movement of the door is accomplished by means of a cable 64 passing over a pulley 65 and having its lower end connected to the door 63 with sufficient amount of slack so that the door 63 is not opened until the lift approaches its bottom position.

The cars are moved step by step to the right along the track 15 by means of the hydraulic cylinder 22 and plunger 23, as heretofore described, and after each forward movement of the train to the right, the end car is lifted upon the lift or elevator 24 to starting position at the end of the track 14. During their movement along the track 15, it is necessary to put new lifting bars in the openings 65 (Fig. 1) left by the removal of the bars 46, in the section C of the mold, and also to restore the contour of the mold for the succeeding bending operations. This work is accomplished by operators working alongside the tracks 15, the molds during this return movement being open to the atmosphere to facilitate cooling. The templates 66 are then employed to smooth off the surface of the molds to a contour corresponding to that of the templates. These templates are in the form of plates carried by bars 67 which are mounted, as heretofore pointed out, on the plate 42 (Fig. 7) extending longitudinally of the molds, and in operation, the bars 67 carrying the plates 66 are slid along the plates 42, thus bringing the mold to the desired contour, which may further be finished up by hand work, if this is necessary.

The cars when moved to their upper positions by the lift 24 are brought into alinement with the track 14 and moved forward step by step through section A preceding the bending section B of the kiln by means of the hydraulic pusher 19, 21. The compartment 68 serves to preheat the mold to bring it up to a temperature in the neighborhood of 700 deg. F. The mold because of its mass retains a very considerable amount of heat before it is placed in the compartment 68, but it is desirable to have this temperature increased to a substantial degree. The glass plate 69 is lowered onto the mold when it arrives at the station 70, this being accomplished by means of a hoist 71 mounted upon a suitable track to permit the ready movement of the plate to correspond to the position of the car. The support of the plate from the hoist 71 is accomplished by means of a cable 72 carrying a vacuum frame 73 at its lower end. From this point on, the movement of the car carrying the glass plate follows the cycle heretofore described, the temperature of the mold and plate being gradually raised until it may be bent down into the mold in the third section of the kiln.

It is possible to lift the bent sheets from the molds by means other than the bars 46 embedded in the sand, as the bent sheet is relatively strong and gripping devices might be applied to the end edges to give the necessary support, but the bars embedded in the sand are preferred, even though the contour of the mold must be restored after each operation, as they give a very positive method for lifting the sheet and provide a maximum degree of safety against breakage as any strain imposed upon the glass thus supported is negligible. The invention, however, is not limited to this particular method of transferring the glass sheets from the outlet end of the bending and annealing kiln to the inlet end of the cooling tunnel B.

Figs. 8 to 13 illustrate a modification of smaller capacity than the one heretofore described and one in which the apparatus is all on one level. In this construction, 74 is the bending and annealing kiln, 75 is the cooling tunnel through which the glass sheets are passed after annealing, and 76 is a transfer passage connecting the ends of the kiln and cooling tunnel. The cars are carried through the kiln 74 on the track 77 and returned on the track 78 after the glass sheets have been removed therefrom. A pair of cross tracks 79 and 80 connect the tracks 77 and 78 at their ends. The cars and the means embedded in the molds for lifting the glass sheets after they have been bent are the same as in the construction of Figs. 1 to 7. Mounted above the center of the track 77 at the right hand end thereof (Fig. 10) is a rail 81 carrying the crane 82 for handling the glass sheets which are placed on the molds as they enter the kiln 74. The crane is provided with a vacuum frame 83 for bringing the sheets into position over the molds and lowering them.

Mounted at the right hand end of the cooling tunnel. 75 is a rail 84 (Fig. 11) carrying a crane 85 for handling the sheets as they emerge from the cooling tunnel, such handling means comprising a swing 86 with suitable devices for gripping the ends of the bent sheets at their edges for supporting them while they are being moved from the transfer device in the cooling tunnel to a storage rack or truck (not shown). The bending and annealing kiln 74 is similar to the one heretofore described except that it is shorter, being divided into only seven sections, the approximate temperature gradient being indicated on Fig. 8. This means for giving the cars a step by step movement through the kiln, is different from that heretofore described and involves the use of an endless chain 87 provided with hooks 88, such chain passing around pulleys 89 and 90, the former of which is rotated from a motor 91. This endless forwarding device might be operated continuously in one direction, but is preferably moved back and forth so that the hooks 88 all lie outside the right hand end of the kiln, the hooks being arranged so that they engage the rear ends of the cars on their movement to the left. The cars in the kiln are thus moved in a train as in the construction of Figs. 1 to 7. The chain or cable carrying the hooks is preferably guided so that it lies in a slot below the level of the track 77.

Figure 12:
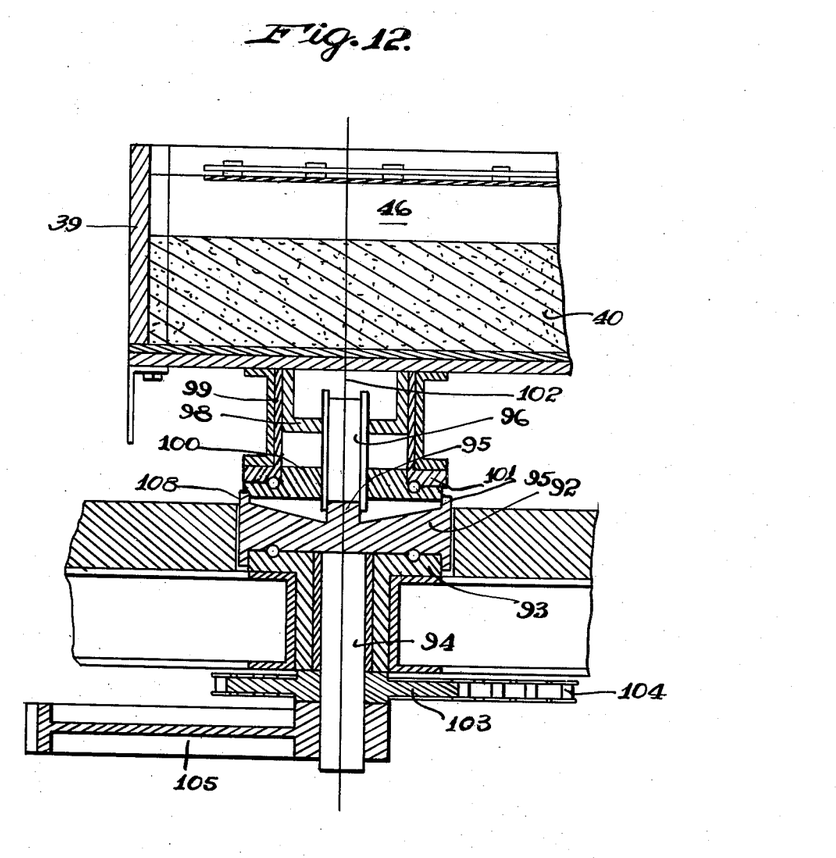
Fig. 12 is an enlarged section on the line XII—XII of Fig. 8
Figure 13:
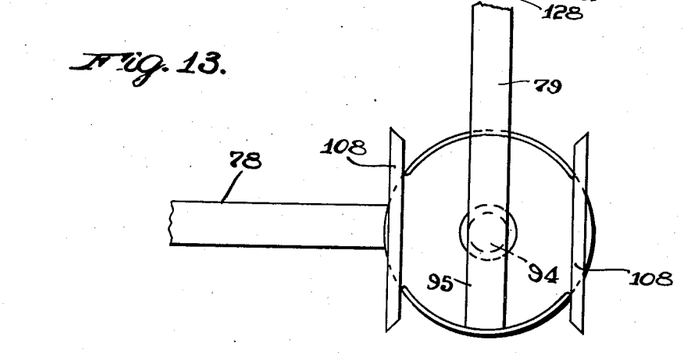
Fig. 13 is a plan view of the wheel turntable.

At the meeting ends of the four tracks, turntable devices are provided for shifting the cars between the tracks. A turntable is provided for each wheel, as indicated in Fig. 12, in which 92 is one of the turntables having a roller bearing on the disc 93 seated in the floor and being provided with a shaft 94 for turning the table. The member 92 is provided with a flange 95 for fitting into the groove of the wheel 96. The wheel 10 is swiveled like a caster, its axis 97 being mounted in a cylindrical member 98 which turns freely in a sleeve 99 secured to the bottom of the car frame. The member 98 is provided with a flange 100 which opposes an annular flange 101 secured to the sleeve 99, roller bearings being provided between the flanges 100 and 101. This arrangement permits the wheel to rotate about the vertical axis 102 when the turntable 92 is rotated by its shaft 94. Each of the shafts 94 carrying the turntables is provided with a sprocket 103, around which passes a sprocket chain 104. One of the shafts 94 is provided with a toothed quadrant 105 for rotating the shaft through an angle of 90 degrees. This quadrant is engaged by a spur gear 106 on a vertical operating shaft which is provided at its upper end with a hand wheel 107. It will be seen that when the four wheels of the car are run onto the turntables and the quadrant is turned through 90 degrees, the turning of the members 92 rotates the car wheels through an angle of 90 degrees, so that the grooves in the wheels are in position to engage the rails of the track to which the car is to be transferred. In order to remove part of the strain of turning the wheel from the flange 95, the member 92 is provided at its side edges with a pair of flanges 108 which engage the edges of the plate 100.

Figure 8:
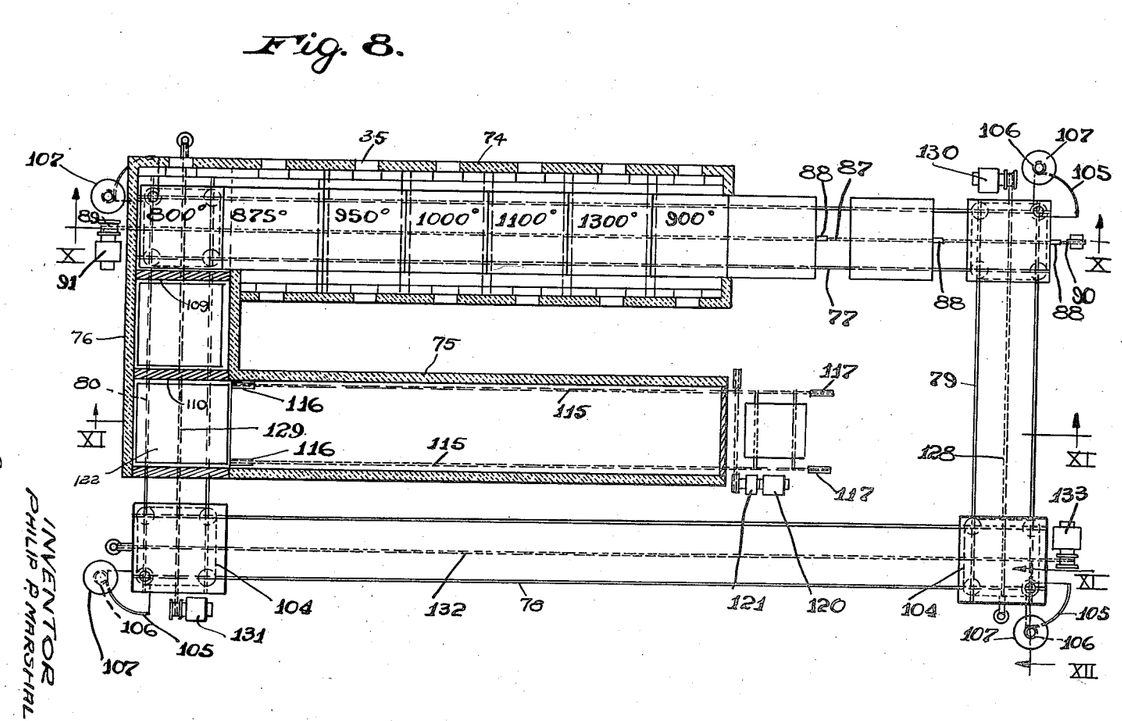
Fig. 8 is a horizontal section through a modified construction.
Figure 9:
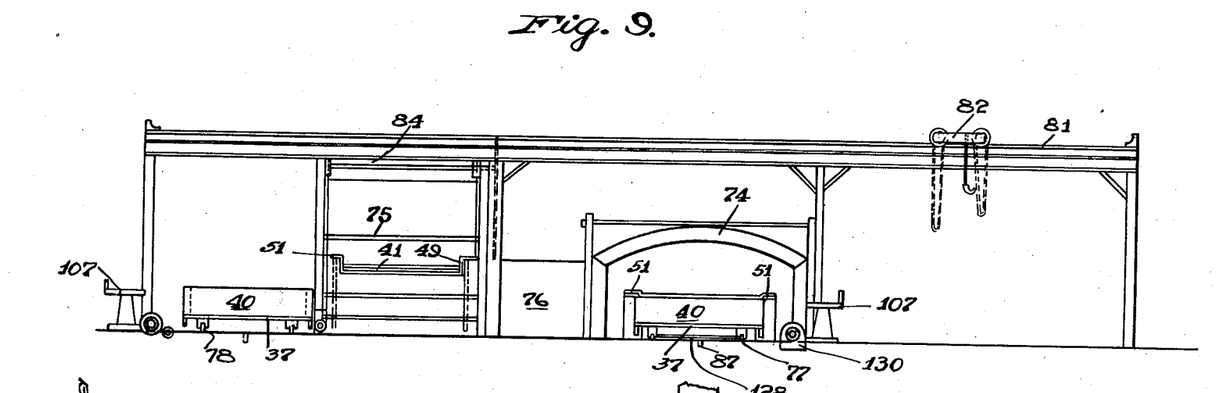
Fig. 9 is an end elevation of the Fig. 8 construction.
Figure 10:
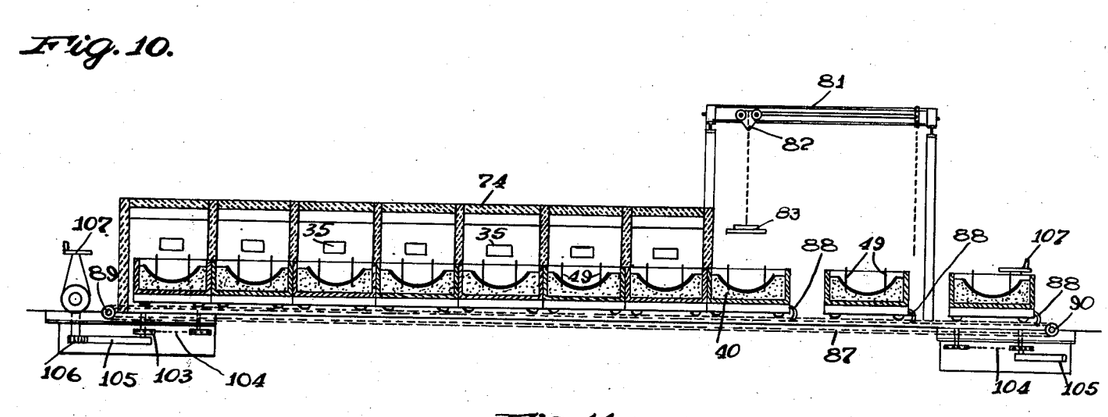
Figs. 10 and 11 are longitudinal vertical sections on the lines X—X and XI—XI respectively of Fig. 8.

The end of the kiln 74 is connected with the end of the cooling tunnel by means of the passage 76, which passage is closed off from the kiln and the tunnel when no transfer is being made by means of the vertically sliding doors 109 and 110 (Fig. 8). These doors are each raised and lowered by means of cables 111 (Fig. 11) passing around drums on a shaft 112 mounted on the beam 113 which forms part of the superstructure. The shaft 112 is operated by means of a chain 114 passing around a sprocket on the end of the shaft 112.

Figure 11:
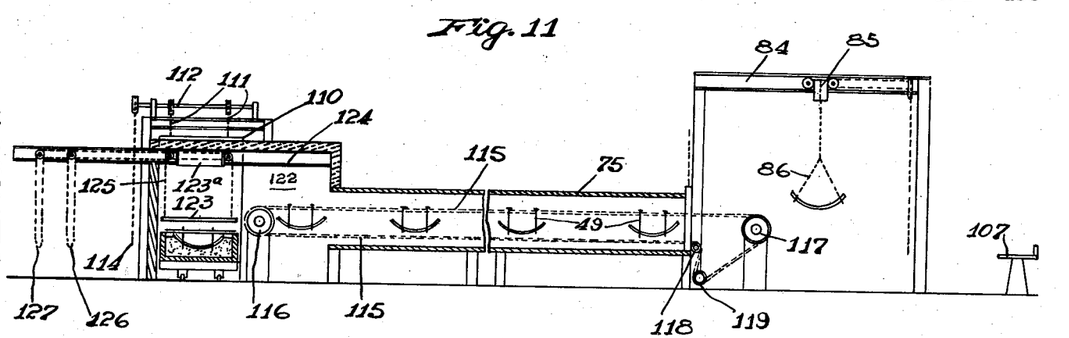

The means for moving the bent sheets through the cooling tunnel after their removal from the molds comprises a pair of endless chains 115 passing around the sprockets 116 and 117 at the ends of the tunnel. These chains also pass around a pair of sprockets 118 and 119, the latter of which is driven from the motor 120 through the intermediary of a worm wheel (Fig. 8) in the casing 121. This transfer device may be operated either intermittently or continuously, and when the sheets emerge from the right hand end of the tunnel, they may be removed by the swing 86 (Fig. 11) heretofore described. Means are provided for removing the glass sheets from the molds and placing them upon the carrier chains 115 when the molds arrive in the section 122 of the cooling tunnel. This is accomplished by means of a lifting device in the form of a pair of bars 123 (Fig. 11) mounted upon a crane 123a, which is in turn supported upon a rail 124 extending longitudinally of the center line of the cooling tunnel. This crane is provided with a pair of cables 125 for lifting each of the bars 123, and these bars are so positioned that when they are raised, they will engage the lower sides of the arms 51 which carry the lifting bars 46 in the mold (Fig. 5). The crane is movable longitudinally of the beam 124 from the position shown in Fig. 11 to a position at the right thereof so that the crane lies over the end of the carrier chains 115. The vertical movement of the bars 123, therefore, first lifts the glass sheet from the mold, after which, the crane is moved to the right (Fig. 11) to a position over the carrier chains. The lowering of the bars 123 then transfers the sheet and its carriers to the transfer chain. After the car carrying the empty mold is moved out of the compartment 122 and onto the turntable device at the end of the track 78, another mold is brought into the compartment 122, and the crane carrying the bars 123 may now be moved downward and to the left to bring the bars beneath the ends of the sheet lifting members 51 so that the apparatus is in position for a second movement of transfer as above described. The crane 123a is operated from two chains 126 and 127 located to the left of the compartment 122, as indicated in Fig. 11. The chain 126 operates through suitable connections to raise and lower the cables 125, while the chain 127 operates through suitable connections to move the crane longitudinally of the beam 124, thus providing the necessary operating means for moving the crane back and forth along the beam and for raising and lowering it to perform the functions of transferring the glass sheets from the molds to the carrier chains 15 as heretofore described.

The cars are moved along the cross tracks 79 and 80 (Fig. 8) by chains 128 and 129 passing around pulleys at the ends of the tracks and provided with hooks as heretofore described in connection with the chain 87 for moving the cars along the track 77. The chain 128 is operated by a motor 130, while the chain 129 is operated by a motor 131.

The cars are moved along the track 78 from the left hand end to the right hand end thereof by means of an endless chain or cable 132 passing around pulleys at the ends of the track and provided with hooks as heretofore described, such cable or chain being operated from the motor 133. Provision is thus made for shifting the tables over four tracks, the cars being returned to the right hand end of the track 77 for preparation for another bending operation, which includes the placing of the lifting devices in the molds and the smoothing and truing up of the surfaces of the molds as heretofore described in connection with the construction of Figs. 1 to 7. The functioning of the apparatus is analogous to that described in connection with the form of apparatus shown in Figs. 1 to 7.

What I claim is:

1. Apparatus for bending glass sheets comprising a tunnel kiln, means for heating the kiln so that the temperature ranges progressively along the length thereof up to the bending temperature of the glass and then decreases to a point below the lower limit of the critical annealing range of the glass, cars each provided with a mold of finely divided refractory material having a face of the contour to which the glass sheets are to be bent, means for lifting the glass sheets from the molds after they have been bent and cooled through the critical annealing range, means for moving the cars through the kiln and returning them to the starting end thereof after the removal of the bent sheets, a cooling tunnel having its receiving end adjacent the point of removal of the glass sheets from the molds, means whereby the glass sheets are transferred to the receiving end of the cooling tunnel, and means for carrying the sheets through the cooling tunnel, the temperature of said cooling tunnel decreasing from its receiving end to its outlet end so that the sheets are reduced to handling temperature in their passage therethrough.

2. Apparatus for bending glass sheets comprising a tunnel kiln, means for heating the kiln so that the temperature ranges progressively along the length thereof up to the bending temperature of glass and then decreases to a point below the lower limit of the critical annealing range of the glass, cars each provided with a mold of finely divided refractory material having a face of the contour to which the glass sheets are to be bent, lifting members embedded in the mold material of each mold beneath the surface thereof for lifting the glass sheets from the molds after they have been bent and cooled through the critical annealing range, means for moving the cars through the kiln and returning them to the starting end thereof after the removal of the bent sheets, a cooling tunnel having its receiving end adjacent the point of removal of the glass sheets from the molds, means whereby said lifting means with the glass sheets thereon are transferred from the molds to the receiving end of the cooling tunnel, and means for carrying the sheets through the cooling tunnel, the temperature of such cooling tunnel gradually decreasing from its receiving end to its outlet end, so that the sheets are reduced to handling temperature in their passage therethrough.

3. Apparatus for bending glass sheets comprising a tunnel kiln, means for heating the kiln so that the temperature ranges progressively along the length thereof up to the bending temperature of glass and then decreases to a point below the lower limit of the critical annealing range of the glass, cars each provided with a mold of finely divided refractory material having a face of the contour to which the glass sheets are to be bent, lifting members embedded in the mold material of each mold beneath the surface thereof for lifting the glass sheets from the molds after they have been bent and cooled through the critical annealing range, means for moving the cars through the kiln, a cooling tunnel having its receiving end adjacent the point of removal of the glass sheets from the molds, means whereby said lifting means with the glass sheets thereon are transferred from the molds to the receiving end of the cooling tunnel, means for carrying the sheets through the cooling tunnel, the temperature of such cooling tunnel gradually decreasing from its receiving end to its outlet end, so that the sheets are reduced to handling temperature in their passage therethrough, and means for removing the cars from the tunnel kiln and returning them to the entrance end thereof.

4. Apparatus for bending glass sheets comprising a tunnel kiln, means for heating the kiln so that the temperature ranges progressively along the length thereof up to the bending temperature of glass and then decreases to a point below the lower limit of the critical annealing range of the glass, cars each provided with a mold of finely divided refractory material having a face of the contour to which the glass sheets are to be bent, lifting members embedded in the mold material of each mold beneath the surface thereof for lifting the glass sheets from the molds after they have been bent and cooled through the critical annealing range, means for moving the cars through the kiln, a cooling tunnel having its receiving end adjacent the point of removal of the glass sheets from the molds, means whereby said lifting means with the glass sheets thereon are transferred from the molds to the receiving end of the cooling tunnel, means for carrying the sheets through the cooling tunnel, the temperature of such cooling tunnel gradually decreasing from its receiving end to its outlet end, so that the sheets are reduced to handling temperature in their passage therethrough, means for returning the cars from the tunnel kiln and returning them to the entrance end thereof, and spreader means along the line of return movement of the cars adapted to move over the surface of the molds and smooth the material thereof to the desired contour.

5. Apparatus for bending glass sheets comprising a tunnel kiln, means for heating the kiln so that the temperature ranges progressively along the length thereof up to the bending temperature of the glass and then decreases to a point below the lower limit of the critical annealing range of the glass, cars each provided with a mold having a face of the contour to which the glass sheets are to be bent, means for lifting the glass sheets from the molds after they have been bent and cooled through the critical annealing range, means for moving the cars through the kiln and returning them to the starting end thereof after the removal of the bent sheets, a cooling tunnel having its receiving end adjacent the point of removal of the glass sheets from the molds, means whereby the glass sheets are transferred to the receiving end of the cooling tunnel, and means for carrying the sheets through the cooling tunnel, the temperature of such cooling tunnel decreasing from its receiving to its outlet end.

PHILIP P. MARSHALL.